United States Patent [19]

DeWitt

[11] Patent Number: 4,597,701
[45] Date of Patent: Jul. 1, 1986

[54] HOOK FOR RETAINING CONTAINER CORNER CASTING

[75] Inventor: Nicklas R. DeWitt, Portola Valley, Calif.

[73] Assignee: X-Ten Corporation, San Francisco, Calif.

[21] Appl. No.: 701,850

[22] Filed: Feb. 15, 1985

[51] Int. Cl.⁴ .............................................. B60P 7/06
[52] U.S. Cl. .......................................... 410/84; 410/76
[58] Field of Search ....................... 410/77, 78, 79, 80, 410/82, 84, 90, 52, 71, 73–76; 292/63, 67, 240, 241

[56] References Cited

U.S. PATENT DOCUMENTS

| 2,041,650 | 5/1936 | Swann | 292/241 |
| 2,886,362 | 5/1959 | Dall | 292/63 |
| 2,930,645 | 3/1960 | Dall | 292/63 |
| 3,078,115 | 2/1963 | Harlander et al. | 410/77 |
| 3,984,117 | 10/1976 | Bates et al. | 410/77 |
| 4,089,275 | 5/1978 | Pelletier | 410/79 |
| 4,114,718 | 9/1978 | Lipshield | 410/77 |
| 4,221,515 | 9/1980 | Brown et al. | 410/78 |
| 4,430,032 | 2/1984 | Morgan | 410/80 |

FOREIGN PATENT DOCUMENTS

| 132846 | 5/1929 | Switzerland | 292/67 |
| 11907 | of 1912 | United Kingdom | 292/67 |

Primary Examiner—Robert B. Reeves
Assistant Examiner—Dennis C. Rodgers
Attorney, Agent, or Firm—Townsend and Townsend

[57] ABSTRACT

The present invention is a hooking mechanism for fastening a shipping container ot a support platform. A hook for penetrating the aperture of a corner casting along either axis of the aperture is provided. The hook is mounted on a pivot which is movable relative to the support platform in a direction parallel to the face of the casting being penetrated. The pivot can be moved to allow the hook to enter the aperture when the casting is not precisely aligned. The movable pivot also allows the point of penetration to be varied to match either the major or minor axis of the aperture. The movable pivot allows the hook to penetrate the aperture in the corner casting while moving along an arcuate path, thereby permitting entry into the aperture at a constant angle of attack without the hook hitting the far wall of the inside of the corner casting. A pin or a bar is used to lock the hook in the engaged position.

15 Claims, 4 Drawing Figures

U.S. Patent  Jul. 1, 1986  Sheet 1 of 2  4,597,701
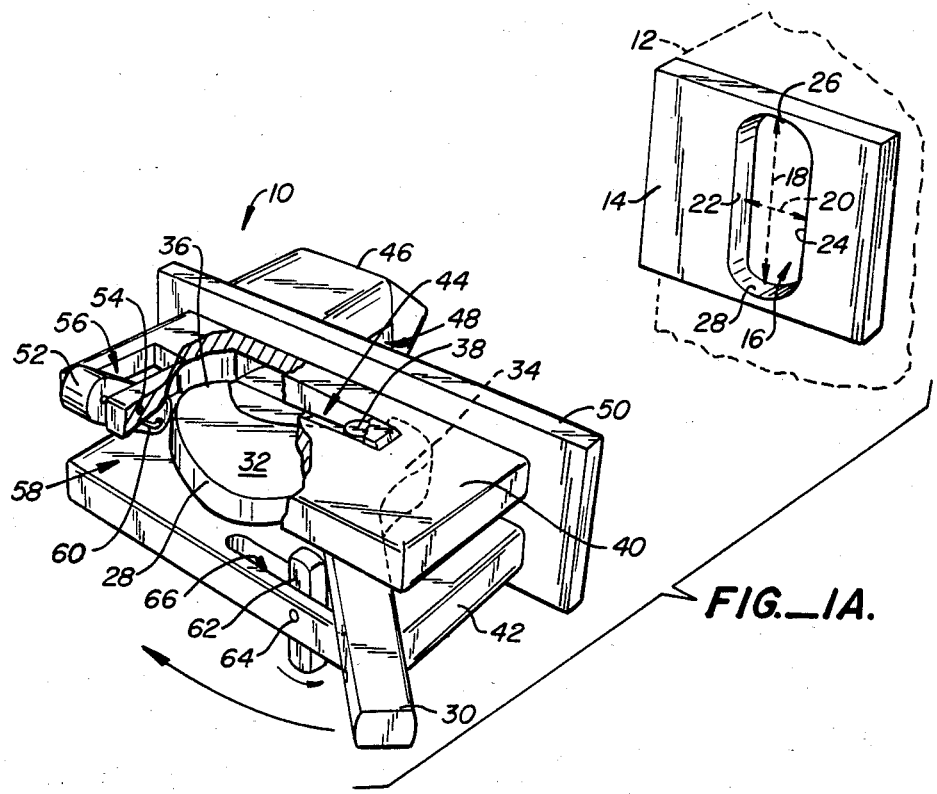
FIG._1A.
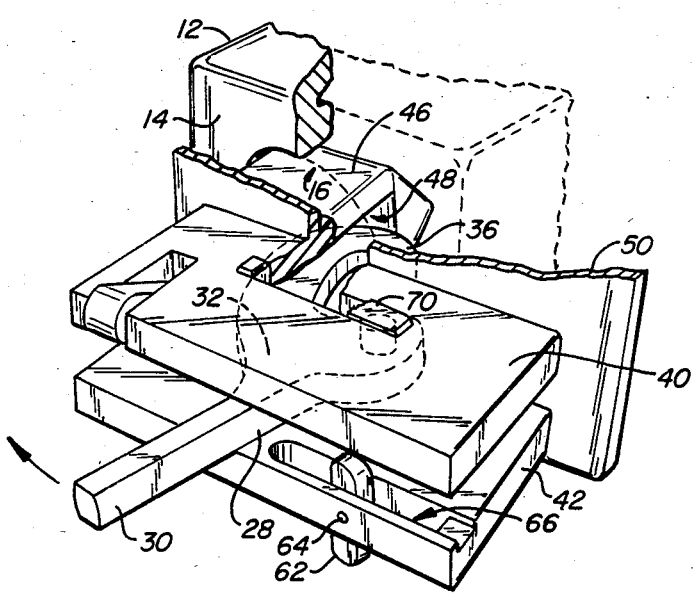
FIG._1B.

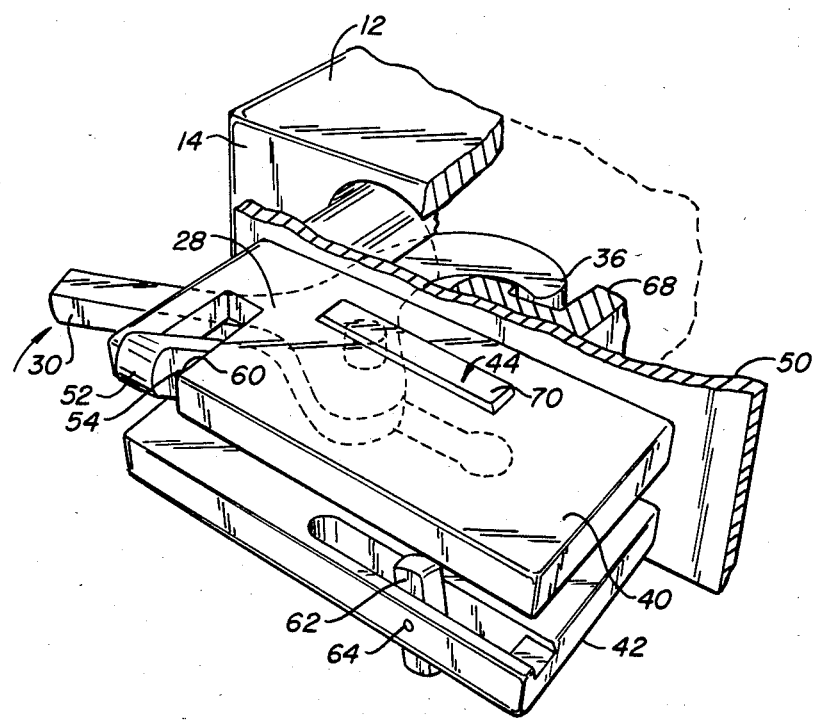
FIG._1C.
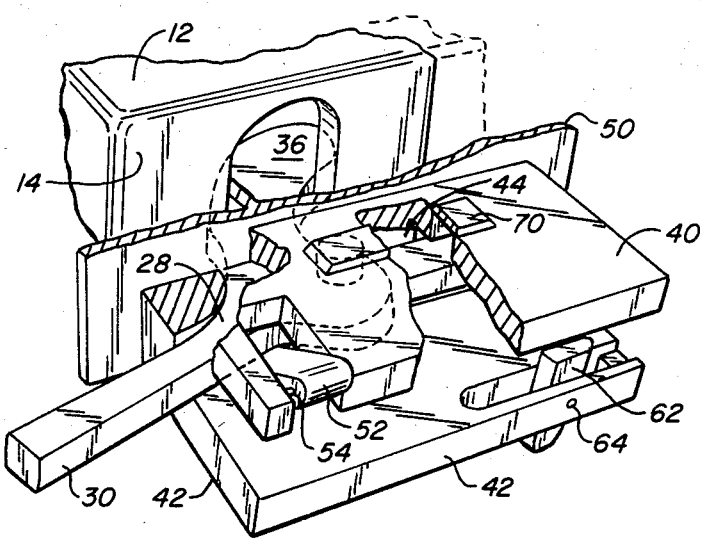
FIG._1D.

HOOK FOR RETAINING CONTAINER CORNER CASTING

BACKGROUND OF THE INVENTION

This invention relates to fasteners for securing shipping containers to a support platform.

Shipping containers of varying lengths from twenty to forty feet have become the standard for shipping cargo on ships, trains and trucks. These containers typically have a standard corner casting for securing the container. This casting is a cube embedded in each corner of the container with three sides exposed to the exterior of the container. The casting is hollow and has a hole in each of the three sides to receive a fastener for attaching the container to a support platform, which may be a truck chassis, a train flatbed or the deck or hold of a ship. The holes in the casting are typically shaped like an oval with two flat sides, thus having a long axis and a short axis.

One type of fastener presently used is a twist-lock type having a head shaped complementary to the hole in the casting. The head is attached to the end of a narrow neck. The head is inserted into the casting hole and then the neck is rotated. This twists the head so that its long dimension overlaps the short axis of the hole, thereby preventing it from being removed and securing it to the casting. An example of such a fastener is shown in U.S. Pat. No. 2,963,310 to Abolins. A twist-lock fastener has the advantage of being simple, but requires precise registration of the container and its corner castings with the fastener. This precise registration or alignment is sometimes difficult under actual operating conditions.

Other fasteners use a nut and bolt arrangement to attach the container to a support platform. These fasteners require a wrench and are not as simple as the twist-lock fasteners.

Hook-type fasteners are used to couple the corner castings of adjacent or stacked containers together, such as when several containers are stacked on the deck of a ship. Examples of this type of fastener are shown in U.S. Pat. No. 3,601,866 to Odin and U.S. Pat. No. 3,609,824 to Vanriet et al. Hooks have also been used as part of a nut and bolt operation with the hook being part of the bolt, such as the fastener shown in U.S. Pat. No. 3,880,090 to Duclos. A more elaborate hook-type fastener is shown in U.S. Pat. No. 3,986,460 to Voigt et al. Voigt shows a double-action hook with two opposing extended hooks which are inserted into the casting aperture and moved so that the tip of each hook exceeds the minor axis dimension of the aperture. Such a mechanism, while not requiring the precise alignment of the twist-lock type of fastener, is complex and has a large number of moving parts.

SUMMARY OF THE INVENTION

The present invention is a hooking mechanism for fastening a shipping container to a support platform. A hook for penetrating the aperture of a corner casting along either axis of the aperture is provided. The hook is mounted on a pivot which is movable relative to the support platform in a direction parallel to the face of the casting being penetrated. The pivot can be moved to allow the hook to enter the aperture when the casting is not precisely aligned. The movable pivot also allows the point of penetration to be varied to match either the major or minor axis of the aperture. The movable pivot allows the hook to penetrate the aperture in the corner casting while moving along an arcuate path, thereby permitting entry into the aperture at a constant angle of attack without the hook hitting the far wall of the inside of the corner casting. A pin or a bar is used to lock the hook in the engaged position.

Preferably, the hook is crescent-shaped with the crescent having a wide end and a narrow end. A handle is attached to the wide end of the crescent and the narrow end of the crescent penetrates the aperture. The pivot is fastened to the wide portion of the crescent. The hook is preferably mounted between two parallel plates with the pivot sliding within a slot in each of the plates. The locking mechanism is a spring-biased bar which extends into the space between the plates thereby blocking the handle of the hook from moving. When the hook is inserted into the aperture, its handle passes by this locking bar pushing it and causing it to pivot into a slot within one of the plates. After the handle passes, the bar moves downward locking the hook in place. A similar bar is used to hold the hook in the open position, thereby preventing interference with the placement of a container.

The hooking mechanism of the present invention can be mounted either underneath the platform supporting the container or along the sides at any orientation. To aid in placement of the container, a locating pin or member can be added which will penetrate the aperture of a corner casting allowing the container to be placed and aligned. This pin or member has a slot in it for allowing the hook to pass through it and into the aperture of a corner casting.

Precise alignment of the container is not required because the hook provides for sufficient leeway on all sides to allow it to fasten a container which is not precisely aligned. The present invention has the further advantage of a simple construction with very few moving parts. It is also simple and easy to operate, thus making it likely to endure under difficult operating conditions. The crescent shape and moving pivot allows the fastener to operate within the limited interior of a corner casting.

BRIEF DESCRIPTION OF THE DRAWINGS

FIGS. 1A–1D show a perspective view of the preferred embodiment of the present invention in progressive positions from an open to a locked position.

DETAILED DESCRIPTION OF THE PREFERRED EMBODIMENT

FIG. 1A is a perspective view of the preferred embodiment of the hooking mechanism 10 of the present invention. A corner casting 12 is shown separate from hooking mechanism 10 with all but a facing plate 14 being shown in phantom. The casting has an aperture 16 having a major axis 18 and a minor axis 20. The aperture has a pair of parallel walls 22, 24 joined by 180° of a circle at ends 26, 28. The hooking mechanism 10 of the present invention can penetrate corner casting 12 in the orientation shown in FIG. 1A or with the corner casting 12 being rotated 90°.

Hooking mechanism 10 has a hook 28 with an elongate handle 30 connected to a crescent 32 having a wide end 34 and a narrow end 36. Wide end 34 is coupled to pivot 38. Hook 28 is mounted between opposing plates 40 and 42. Plate 40 has a slot 44 within which pivot 38 can slide and an identical slot (not shown) is defined by plate 42. A locator bar 46 having a slot 48 is provided for engagement with aperture 16 of casting 12. Locator bar 46 extends from an abutment plate 50 which is coupled to opposing plates 40 and 42. Abutment plate 50 is provided to contact the edge of a container being fastened. Slot 48 in locator pin 46 allows hook 28 to slide through and into aperture 16.

A locking bar 52 is shown coupled to plate 40 by a hinge 54. Locking bar 52 rotates from a position within a slot 56 in plate 40 to a position extending into a space 58 between opposing plates 40 and 42. Locking bar 52 is biased into a lower position in space 58 by a spring 60. In order to keep hook 28 in an open position before a container is positioned, a retaining member 62 is coupled to plate 42 by a hinge 64. Bar 62 rotates within a slot 66 and can be rotated to extend into space 58 thereby retaining hook 28 in an open position as shown in FIG. 1A.

In order to fasten a container, the container with its corner casting 12 is brought up to the edge of abutment plate 50 and is aligned with alignment bar 46 penetrating aperture 16 of corner casting 12 as shown in FIG. 1B. Retaining bar 62 is then rotated until it is within slot 66, allowing handle 30 of hook 28 to pass by as shown in FIG. 1B. Narrow end 36 of the crescent portion 32 of hook 28 penetrates through slot 48 into and through aperture 16. This penetration continues, as shown in FIG. 1C, as handle 30 of hook 28 passes underneath locking bar 52, forcing locking bar 52 into an upper position. As complete engagement of hook 28 is achieved, handle 30 passes locking bar 52, allowing spring 60 to pull locking bar 52 down into the locked position. Locking bar 52 thus blocks movement of hook 28, keeping it in a locked position.

Because the forces due to any movement of the container and its corner casting 12 are transmitted through hook 28 to locking bar 52, it is preferable to have a strong hinge 54, such as one of ½-inch diameter. Upon penetration into aperture 16, in the preferred shape, narrow end 36 of hook 28 will penetrate almost to the far end of the interior of casting 12. In the locked position, end 36 will come to rest within close proximity of an interior wall 68 of facing plate 14.

A covering 70 may be provided for slot 44 in order to keep slot 44 free of snow, ice and mud. Preferably, hook 28 and pivot 38 are molded as a single unit. Pivot 38 should preferably be lubricated by adding a lubricant or using an alloy that it self-lubricating. The locking mechanism 10 can be secured to a supporting platform by welding or other methods.

As will be understood by those familiar with the art, the present invention may be embodied in other specific forms without departing from the spirit or essential characteristics thereof. Accordingly, the disclosure of the preferred embodiment of the invention is intended to be illustrative, but not limiting, of the invention, which is set forth in the following claims.

What is claimed is:

1. A fastener for engaging a corner casting of a shipping container to secure the container to a flat support, said casting being hollow, having a planar surface abutting and parallel to said flat support, and defining through said planar surface at least one aperture, comprising:
   a hook adapted to penetrate said aperture; and
   a pivot coupling said hook to said flat support, said pivot being movable parallel to said planar surface relative to said flat support to move said hook from a first position outside said corner casting to a second position of penetration of said corner casting for restraining a wall of said corner casting between said hook and said flat support, said pivot point maintaining a constant spatial interval from said pivot point to said planar surface during all positions of penetration of said hook, whereby said movable pivot allows the point of attack of said hook penetrating said aperture to be varied to match the position and orientation of said aperture without towards and away movement of said pivot point from said planar surface.

2. The fastener of claim 1 wherein said aperture has a major axis and a minor axis and said hook in said second position extends sufficiently far into said corner casting to restrain said wall when said major axis is oriented in the same plane as said hook.

3. The fastener of claim 2 wherein said hook includes a first end for penetrating said aperture, said first end having a dimension that does not exceed the width of said minor axis.

4. The fastener of claim 1 further comprising means for locking said hook in said second position.

5. The fastener of claim 1 wherein said hook comprises an elongate handle and a crescent-shaped portion, said crescent-shaped portion having a wide end coupled to said handle and said pivot and a narrow end for penetrating said aperture in said casting.

6. The fastener of claim 1 further comprising a pair of parallel plates adapted for coupling to said flat support, said hook pivoting through a space between said plates.

7. The fastener of claim 6 wherein each of said plates defines a slot for engaging said pivot and allowing lengthwise movement of said pivot along said slots.

8. The fastener of claim 6 further comprising:
   a locking member rotatable between a slot in one of said plates and said space between said plates;
   a second pivot coupling said locking member to said plate; and
   biasing means for forcing said locking member to a position in said space;
   whereby said locking member contacts a part of said hook thereby retaining said hook in an engaged position with said casting.

9. The fastener of claim 6 further comprising an abutment plate mounted normal to said parallel plates for contacting said corner casting, said abutment plate defining a slot allowing said hook to pass through.

10. The fastener of claim 9 further comprising a locator bar coupled to said abutment plate for engaging said aperture in said casting to orient said container relative to said apparatus, said locator bar defining a slot allowing said hook to pivot through said locator bar and into said casting.

11. The fastener of claim 6 further comprising a pivotable member coupled to one of said plates for engaging said hook to prevent said hook from moving to a position for engaging said casting.

12. A fastener for engaging a corner casting of a shipping container to secure the container to a flat support, said casting being hollow, having a planar surface abutting and parallel to said flat support, and defining through said planar surface at least one aperture, comprising:
   a hook adapted to penetrate said aperture, said hook comprising an elongate handle and a crescent-shaped portion, said crescent-shaped portion having a wide end coupled to said handle and a narrow end for penetrating said aperture in said casting;

a pivot coupling said wide end of said hook to said flat support, said pivot being movable parallel to said planar surface relative to said flat support to move said hook from a first position outside said corner casting to a second position of penetration of said corner casting for restraining a wall of said corner casting between said hook and said flat support said pivot point maintaining a constant spatial interval from said pivot point to said planar surface during all positions of penetration of said hook, whereby said movable pivot allows the point of attack of said hook penetrating said aperture to be varied to match the position and orientation of said aperture without towards and away movement of said pivot point from said planar surface; and means for locking said hook in a position engaged with said casting.

13. A fastener for engaging a corner casting of a shipping container to secure the container to a flat support, said casting being hollow having a planar surface abutting and parallel to said platform, and defining at least one aperture, comprising:

a hook adapted to penetrate said aperture, said hook comprising an elongate handle and a crescent-shaped portion, said crescent-shaped portion having a wide end coupled to said handle and a narrow end for penetrating said aperture in said casting;

a pair of parallel plates adapted for coupling to said flat support, said hook being movable through a space between said plates;

a first pivot coupling said wide end of said hook to said plates, each of said plates defining a slot for engaging said pivot and allowing lengthwise movement of said pivot parallel to said planar surface along said slots to move said hook from a first position outside said corner casting to a second position of penetration of said corner casting for restraining a wall of said corner casting between said hook and said flat support said pivot point maintaining a constant spatial interval from said pivot point to said planar surface during all positions of penetration of said hook, whereby said movable pivot allows the point of attack of said hook penetrating said aperture to be varied to match the position and orientation of said aperture without towards and away movement of said pivot point from planar surface;

a locking member rotatable between a slot in one of said plates and said space between said plates;

a second pivot coupling said locking member to said plate; and a spring biasing said locking member to a position in said space;

whereby said locking member contacts a part of said hook thereby retaining said hook in an engaged position with said casting.

14. In combination, a corner casting of a shipping container, said casting being hollow, having a planar surface and defining at least one aperture; a flat support abutting and parallel to said planar surface for said container; and a fastener for engaging a corner casting of a shipping container to secure the container to said flat support, comprising:

a hook adapted to penetrate said aperture; and a pivot coupling said hook and said flat support, said pivot being movable parallel to said planar surface relative to said flat support to move said hook from a first position outside said corner casting to a second position of penetration of said corner casting for restraining a wall of said corner casting between said hook and said flat support, said pivot point maintaining a constant spatial interval from said pivot point to said planar surface during all positions of penetration of said hook, whereby said movable pivot allows the point of attack of said hook penetrating said aperture to be varied to match the position and orientation of said aperture without towards and away movement of said pivot point from said planar surface.

15. A method for securing the corner casting of claim 14, comprising:

moving said pivot relative to said flat support toward said aperture;

rotating said hook about said pivot and through said aperture to engage said casting; and securing said hook in said position of engagement.

* * * * *